United States Patent Office 3,344,153
Patented Sept. 26, 1967

3,344,153
ACYLATED SULPHENIC ACID AMIDES AND PROCESS FOR THEIR PRODUCTION
Engelbert Kühle, Cologne-Stammheim, and Erich Klauke, Cologne-Flittard, Germany, assignors to Farbenfabriken Bayer Aktiengesellschaft, Leverkusen, Germany, a German corporation
No Drawing. Filed Feb. 27, 1964, Ser. No. 347,676
Claims priority, application Germany, Mar. 16, 1963, F 39,269
18 Claims. (Cl. 260—347.2)

The present invention concerns novel acylated sulphenic acid amides which exhibit pesticidal properties, as well as a process for their production.

It is an object of the present invention to make available novel acylated sulphenic acid amides. A further object of the invention consists in the provision of novel compounds with strong biocidal and in particular acaricidal and fungicidal properties. Other objects are evident from the description and the examples.

It is already known that aromatic acylated sulphenic acid amides are obtained when aromatic sulphenyl chlorides are reacted with carboxylic acid amides by heating them in the presence of a tertiary amine as the acid binding agent (see, for instance, United States Patent specification No. 2,476,655). During this process, the eliminated hydrochloric acid at once combines with the tertiary amine so as to make impossible an interaction between the hydrochloric acid and the corresponding aromatic acylated sulphenic acid amides.

It has now been found that the novel acylated sulphenic acid amides of the formula

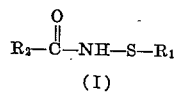

(I)

wherein $R_1$ denotes alkyl, optionally substituted by halogen, and
$R_2$ denotes hydrogen and alkyl, alkenyl, alkinyl, cycloalkyl, alkoxy, alkylamino, aryl, aryloxy or a heterocyclic radical, optionally substituted by alkyl, alkoxy, aryl, aroxy, halogen, nitro, acylamino, hydroxy, alkylmercapto and/or arylmercapto, exhibit strong pesticidal and in particular acaricidal and fungicidal properties.

In addition, it has been found that the acylated sulphenic acid amides of Formula I are obtained by a simple method when primary carboxylic acid amides of the formula

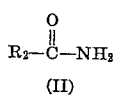

(II)

wherein $R_2$ has the same significance as in Formula I are reacted at elevated temperatures with sulphenyl halides of the formula $$Hal—S—R_1$$

(III)

wherein $R_1$ has the same significance as in Formula I and Hal represents halogen.

It could certainly not be foreseen that the acylated sulphenic acid amides obtainable in accordance with the invention should exhibit strong pesticidal properties since it had not been known previously that chemically similar compounds have biological activities. In addition, it is surprising that the sulphenic acid amides are obtained in good yield during the process according to the invention despite the fact that hydrogen chloride is liberated continuously and that it is not chemically combined during the reaction. It is in fact known that sulphenic acid amides are split up by hydrogen chloride so as to form the corresponding sulphenyl chlorides and amine hydrochlorides (see, for instance, Z. obsc. Chim. 29, 3792 (1959)). It therefore had to be expected that the acylated sulphenic acid amides would break up again.

The substances according to the invention as well as the process according to the invention thus constitute a valuable addition to technical knowledge.

When the starting materials employed for the reaction according to the invention are formamide and dichlorofluoromethylsulphenic acid chloride, the reaction may be represented by the following scheme of formulae:

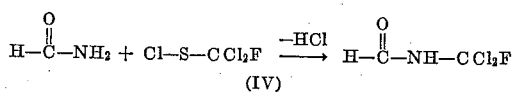

(IV)

The carboxylic acid amides to be employed for the reaction according to the invention are clearly characterised by the above stated Formula II. In this formula, $R_2$ preferably represents hydrogen, alkyl radicals with 1 to 20 carbon atoms, alkenyl radicals with 2 to 5 carbon atoms, alkinyl radicals with 2 to 5 carbon atoms, cycloalkyl with 5 to 7 carbon atoms, alkoxy with 1 to 10 carbon atoms, alkylamino with 1 to 4 carbon atoms in the individual alkyl radicals, aryl with up to 10 carbon atoms, aryloxy with up to 10 carbon atoms as well as heterocyclic rings with 5 to 7 ring members.

These radicals are preferably substituted by alkyl with 1 to 4 carbon atoms, alkoxy with 1 to 4 carbon atoms, phenyl, phenoxy, halogen such as chlorine, fluorine and bromine, nitro, acylamino with 1 to 4 carbon atoms, alkylmercapto with 1 to 4 carbon atoms and arylmercapto with 6 carbon atoms.

The following may be detailed as examples of the carboxylic acid amides to be employed:

Formamide, acetamide, chloroacetamide, trichloroacetamide, 3-chloropropionamide, stearoylamide, acrylamide, methacrylamide, propionamide, nitroacetamide, methoxyacetamide, diphenylacetamide, benzamide, 2-chlorobenzamide, 2-chloro-4-nitrobenzamide, 2-methoxy-4-chlorobenzamide, 3,5-dinitrobenzamide, 4-ethoxy-benzamide, 4-acetylaminobenzamide, 4-fluorobenzamide, diphenylsulphide-4-carboxylamide, phenylacetamide, phenoxyacetamide, naphthoic acid amide, pyromucic acid amide, thiophene-2-carboxylic acid amide, ethylurethane, phenylurethane and dimethylurea.

The sulphenyl halides to be employed for the reaction according to the invention are clearly characterised by the above stated Formula III. In this formula, $R_1$ preferably represents alkyl with 1 to 4 carbon atoms. These alkyl radicals are preferably substituted by chlorine, fluorine and bromine. A particularly important role is played by the halogenated methyl radical.

The following may be detailed as examples of the sulphenyl halides:

Methyl-, ethyl-, butyl-, chloromethyl-, dichloromethyl-, trichloromethyl-, fluorodichloromethyl-, difluorochloromethyl-, tetrachloroethyl- and trifluorodichloroethyl-sulphenyl chloride as well as chlorofluorobromomethyl- and bromodichloromethyl-sulphenyl bromide.

The reaction according to the invention may also be carried out in the presence of insert solvents. These preferably include hydrocarbons such as benzene and toluene, chlorinated hydrocarbons such as chlorobenzene, dichlorobenzene and carbon tetrachloride, and ethers such as dioxane.

The reaction temperatures may be varied within a relatively wide range. In general, the operations are carried out between 50 and 200° C., preferably between 100 and 150° C.

The reaction partners are generally employed in about equimolar proportions. It is however also possible to employ an excess of the sulphenic acid chloride.

The reaction may for instance be carried out by heating the starting materials together in an inert solvent until the evolution of hydrogen chloride has ceased. The resultant reaction mixture is worked up by the usual method.

The representatives from the aliphatic series are usually oils which can be distilled, whilst the reaction products from the aromatic and heterocyclic series are predominantly obtained in crystalline form.

The acylated sulphenic acid amides obtainable in accordance with the invention exhibit strong pesticidal and in particular acaricidal and fungicidal properties. They can therefore be employed for the control of harmful mites, as seed dressings, as cereal shoot fungicides, as soil fungicides, and for the control of those fungi with a pathogenic activity which live on or in the organs of living plants such as the shoot, leaf, flower and fruit.

Among the mites, special importance attaches to the spider mites (Tetranychicae) such as the common spider mite (*Tetranychus telarius*), the fruit tree spider mite (*Paratetranychus pilosus*), to the gall mites such as the currant gall mite (*Ereophyes ribis*) and to the tarsonemides such as *Tarsonemus pallidus*.

The active agents according to the invention can for instance be employed as seed dressings against smut fungi such as *Tilletia tritici*, against fungi living in and harmful to seeds such as *Phoma betae*, and also against fungi living in the soil, for instance from the groups Rhizoctonia, Fusarium and Pythium.

The following may be mentioned as cereal leaf fungi: rust fungi such as *Puccinia garminis* and mildew fungi such as *Erysiphe graminis*.

Phytopathogenic fungi living in the soil are, for instance, *Pythium ultimum*, *Rhizoctonia solani*, *Fusarium solani* and *Verticillium alboatrum*.

The following may be mentioned as examples of fungi with a pathogenic activity on leaves: non-mildew fungi such as *Phytophthora infestans*, *Venturia inaequalis*, genuine mildew fungi such as *Podosphaera leucotricha* and fungi causing tracheomycoses such as *Fusarium oxysporum*.

The substances according to the invention may be employed by themselves or in the form of the usual compositions, such as emulsifiable concentrates, spray powders, pastes, soluble powders, dusting agents and granulates. These are prepared in known manner (see, for instance, Agricultural Chemicals, March 1960, pages 35–38). The following are mainly suitable as assistant agents for this purpose: solvents such as aromatic hydrocarbons (for instance xylene, benzene), chlorinated aromatic hydrocarbons (for instance chlorobenzenes), paraffins (for instance petroleum fractions), alcohols (for instance methanol, butanol), amines (for instance ethanolamine, dimethylformamide) and water; carriers such as powdered natural minerals (for instance caolins, aluminas, talc, chalk) and powdered synthetic minerals (for instance highly dispersed silicic acids, silicates); emulsifying agents such as nonionic and anionic emulsifiers (for instance poly-ethylene oxide esters of fatty acids, poly-ethylene oxide ethers of fatty alcohols, alkyl sulphonates and aryl sulphonates); and dispersing agents such as lignin, spent sulphite liquors and methylcellulose.

In general, these compositions contain between 0.1 and 95 percent by weight of the active agent, preferably between 0.5 and 90 percent.

The acylated sulphenic acid amides or their compositions are applied by the usual method depending on the indications.

The following examples are given for the purpose of illustrating the invention.

*Example of Preparation 1*

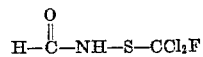

30 g. of formamide and 98 g. of fluorodichloro-methane-sulphenyl chloride are heated to boiling in 125 ml. of dioxane for 3.5 hours. Hydrogen chloride is continuously evolved during this operation. A small amount of a solid product is filtered off, the solvent is evaporated off in vacuo and the reaction product is distilled. 73 g. of N-(formyl)-fluorodichloro-methane-sulphenamide of B.P. 98–101° C./10 mm. Hg are thus obtained. A similar reaction mixture in toluene produces 51 g. of the above compound.

*Example of Preparation 2*

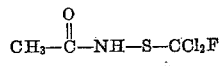

17 g. of acetamide and 43 g. of fluorodichloro-methane-sulphenyl chloride are heated to boiling in 100 ml. of dioxane for 7 hours. When the solvent has been evaporated, the residue is distilled in vacuo. This produces 42 g. of N-(acetyl)-fluorodichloro-methane-sulphenamide of B.P. 122–124° C./10 mm. Hg. An analogous method produces

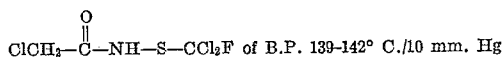 of B.P. 139–142° C./10 mm. Hg

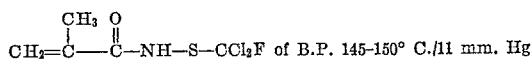 of B.P. 145–150° C./11 mm. Hg

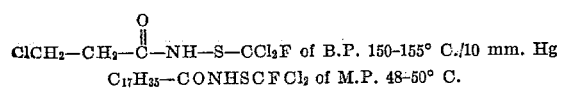 of B.P. 150–155° C./10 mm. Hg

C₁₇H₃₅—CONHSCFCl₂ of M.P. 48–50° C.

*Example of Preparation 3*

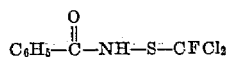

25 g. of benzamide, 43 g. of fluorodichloro-methane-sulphenyl chloride and 100 ml. of dioxane are heated to boiling for 4 hours. When cold the resultant N-(benzoyl)-fluorodichloro-methane-sulphenamide is thereafter filtered off with suction, and 20 g. of M.P. 151–154° C. are obtained. Further amounts of the reaction product can be isolated from the mother liquor. An analogous method produces:

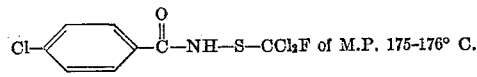 of M.P. 175–176° C.

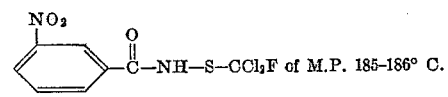 of M.P. 185–186° C.

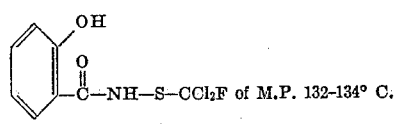 of M.P. 132–134° C.

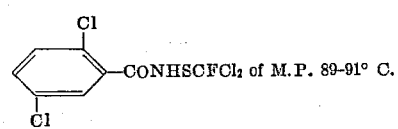 of M.P. 89–91° C.

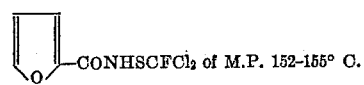 of M.P. 152–155° C.

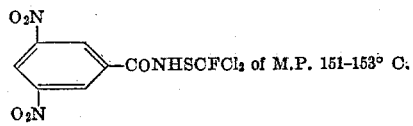 of M.P. 151–153° C.

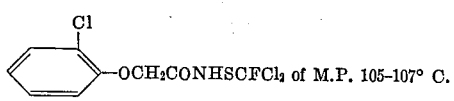—OCH₂CONHSCFCl₂ of M.P. 105–107° C.

Example of Preparation 4

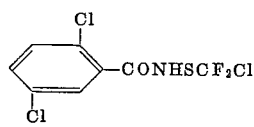—CONHSCF₂Cl 19 g. of 2,5-dichloro-benzamide and 25 g. of difluoro-chloro-methane-sulphenyl chloride are heated to boiling in 100 ml. of dioxane for 4 hours. HCl is continuously given off during this operation. It is concentrated in vacuo and the reaction product, of melting point 100–102° C., is obtained as the residue.

Example of Application 1

In order to prepare a suitable composition of the active agent, one part by weight of the active agent is taken up in one part by weight of dimethylformamide, 20 percent by weight (referred to the active agent) of benzylhydroxy-polyglycol ether are added as the emulsifying agent, and this concentrate is diluted with water to give the desired final concentrations.

Bean plants (*Phaseolus vulgaris*) at a height of about 40 cm. are sprayed with this composition of the active agent until they look as if they had been covered by dew. The bean plants are strongly infested with spider mites (*Tetranychus telarius*) which are resistant towards phosphoric acid esters. After 48 hours, the proportion of the destroyed spider mites is estimated as a percentage of the spider mites originally present. This quantity is given as the degree of destruction.

The following table indicates the results for various active agents:

| Compound | Degree of destruction at a concentration of the active agent of— | |
|---|---|---|
| | 0.2% | 0.02% |
| Cl-C₆H₄-CONHSCFCl₂ | 100 | -------- |
| NO₂-C₆H₄-CONHSCFCl₂ | 100 | -------- |
| Cl₂-C₆H₃-CONHSCFCl₂ | 100 | 40 |
| Cl₂-C₆H₃-CONHSCF₂Cl | 100 | 100 |
| C₆H₅-OCH₂CONHSCFCl₂ | 100 | 90 |

Example of Application 2

The active agents are prepared at the given concentrations by the same method as in Example of Application 1.

In order to determine their activity against flies, about 50 flies (*Drosophila melanogaster*) are introduced into covered Petri dishes, containing filter papers which had been impregnated with the compositions of the active agents until they appeared to be just covered by dew. The degree of destruction of the flies is estimated after 24 hours as a percentage.

The following table states the activity of some active agents.

In order to determine their activity towards caterpillars (*Plutella maculipennis*), white cabbage leaves which had been strongly infested with caterpillars are sprayed with the compositions of the active agents until they are wet with drops. The degree of destruction is estimated after 4 days as a percentage. The following table indicates the results for some active agents:

| Compound | Degree of destruction, as a percentage, for a composition of the active agent with a content of 0.2% of the active agent | |
|---|---|---|
| | *Drosophila melanogaster* | *Plutella maculipennis* |
| HCONHSCFCl₂ | 100 | -------- |
| CH₃—CONHSCFCl₂ | -------- | 100 |
| ClCH₂CONHSCFCl₂ | -------- | 100 |
| C₆H₅CONHSCFCl₂ | 100 | -------- |
| CH₂=C(CH₃)—CONHSCFCl₂ | 100 | -------- |
| Cl-C₆H₄-CONHSCFCl₂ | -------- | 100 |
| Cl₂-C₆H₃-CONHSCFCl₂ | -------- | 100 |
| furyl-CONHSCFCl₂ | 100 | -------- |

Example of Application 3

In order to determine the inhibitor effect of the active agents on the mycelium growth of phytopathogenic soil fungi, the active agents are taken up in 100 times their weight of acetone and added, in the form of this solution, to potato dextrose—agar agar liquefied by warming, so that a concentration of 100 mg. is attained in 1 l. of substrate. When the mixture of the substrate with the active agent has solidified in Petri dishes, the soil fungi under examination are inoculated onto them from the pure cultures in the form of small discs of diameter 5 mm. After they have been incubated at 20° C. for 3 days, the mycelium growth or the inhibitor effect is evaluated.

This shows that the compounds listed below completely inhibit the mycelium growth of the following fungi:

*Corticium rolfsii, Sclerotinia sclerotiorum, Verticillium alboatrum, Thielaviopsis basicola, Phytophthora cactorum, Fusarium culmorum, Fusarium oxysporum* and *Fusarium solani*.

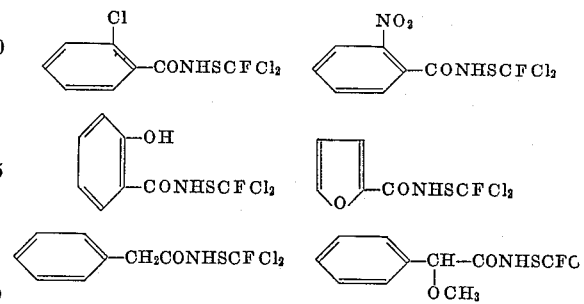

We claim:
1. A compound of the formula:

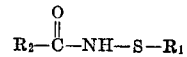

wherein $R_1$ is defined as a haloalkyl of 1-4 carbon atoms; and $R_2$ is a member selected from the group consisting of a hydrogen, alkyl of 1-20 carbon atoms, alkenyl of 2-5 carbon atoms, alkoxy of 1-10 carbon atoms, alkylamino of 1-4 carbon atoms in the alkyl radical, phenyl, hydroxyphenyl, 4-chlorophenyl, 2,5-dichlorophenyl, 2-chlorophenyl, phenyl having 1-2 nitro substituents, 2-chloro-4-nitrophenyl, 4-chloro-2-methoxyphenyl, 4-fluorophenyl, phenoxymethyl, thiophene and furfuryl.

2. A compound of claim 1 wherein $R_1$ is halomethyl.
3. A compound of claim 1 wherein $R_1$ is halomethyl and $R_2$ is hydrogen.
4. A compound of claim 1 wherein $R_1$ is halomethyl and $R_2$ is alkyl of 1-17 carbon atoms.
5. A compound of claim 1 wherein $R_1$ is halomethyl and $R_2$ is haloalkyl of 1-4 carbon atoms.
6. A compound of claim 1 wherein $R_1$ is halomethyl and $R_2$ is alkenyl of 2-5 carbon atoms.
7. A compound of claim 1 wherein $R_1$ is halomethyl and $R_2$ is phenyl.
8. A compound of claim 1 wherein $R_1$ is halomethyl and $R_2$ is chlorophenyl.
9. A compound of claim 1 wherein $R_1$ is halomethyl and $R_2$ is nitrophenyl.
10. A compound of claim 1 wherein $R_1$ is halomethyl and $R_2$ is dinitrophenyl.
11. A compound of claim 1 wherein $R_1$ is halomethyl and $R_2$ is furfuryl.
12. A compound of claim 1 wherein $R_1$ is halomethyl and $R_2$ is hydroxyphenyl.
13. A compound of the formula

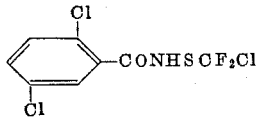

14. A compound of the formula

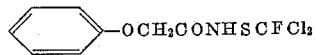

15. A compound of the formula

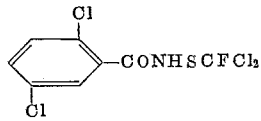

16. A compound of the formula $$ClCH_2CONHSCFCl_2$$

17. A compound of the formula

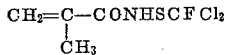

18. A compound of the formula

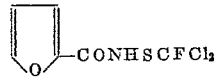

References Cited
UNITED STATES PATENTS
2,476,655   7/1949   Fox et al. _____ 260—347.2

OTHER REFERENCES
Kostsova, A.G., "Zhur. Obshchei Khim.," (J. Gen. Chem.) 18, 729-732, 1948.

ALEX MAZEL, *Primary Examiner.*

HENRY R. JILES, *Examiner.*

J. H. TURNIPSEED, *Assistant Examiner.*